Aug. 14, 1962 T. F. HAWK ET AL 3,048,946
DOOR STRUCTURE FOR AUGER FEED SILOS
Filed April 24, 1959

INVENTORS.
THOMAS F. HAWK.
EDWARD L. SPRINGER.
BY Lockwood, Woodard, Smith & Weikart.
ATTORNEYS.

United States Patent Office 3,048,946
Patented Aug. 14, 1962

3,048,946
DOOR STRUCTURE FOR AUGER FEED SILOS
Thomas F. Hawk, New Palestine, Ind., and Edward L. Springer, 827 Board of Trade Bldg., Indianapolis, Ind.
Filed Apr. 24, 1959, Ser. No. 808,724
3 Claims. (Cl. 50—112)

This invention relates generally to door structures for silos and in particular to such a door structure particularly adapted for providing an adjustable, sealed entry of an auger tube into a silo.

With the vastly increased automation of farming operations in the recent past, particularly livestock feeding, specially constructed sealed silos have come into use. These permit the storage of relatively high moisture content grain and silage without spoilage. Such specially constructed silos are normally provided with elaborate entryways for augers used in removing the material stored in the silo. Since the cross-sectional area of such silos is relatively large, relatively complicated structures are required for shifting the auger tube within the silo so that the complete silo floor area may be covered. Silos of the type referred to above, with their relatively complicated auger shifting arrangements represent sizable capital investments.

The present invention is directed to a relatively economical and simply constructed auger-entry door structure which can be mounted on an existing, conventional silo of, for example, cement construction. Sealing of the conventional silo then equips it for functioning in the same fashion as the relatively expensive specially constructed units. The door structure of the present invention further incorporates a relatively simple means permitting shifting of an auger tube within the silo while maintaining the sealed condition of the tube entry into the silo.

The primary object of the present invention is, therefore, to provide a door structure for silos which provides for sealed entry of an auger tube into the silo, the door structure permitting shifting of the angle of entry of the auger tube with the seal being maintained at various entry angles.

A further object of the present invention is to provide a silo door structure of the type referred to which can be installed on existing silos with a minimum of labor.

A further object of the present invention is to provide a silo door structure which can be installed on existing silos without appreciable structural weakening of the silo.

The full nature of the invention will be understood from the accompanying drawings and the following description and claims:

Figure 1:
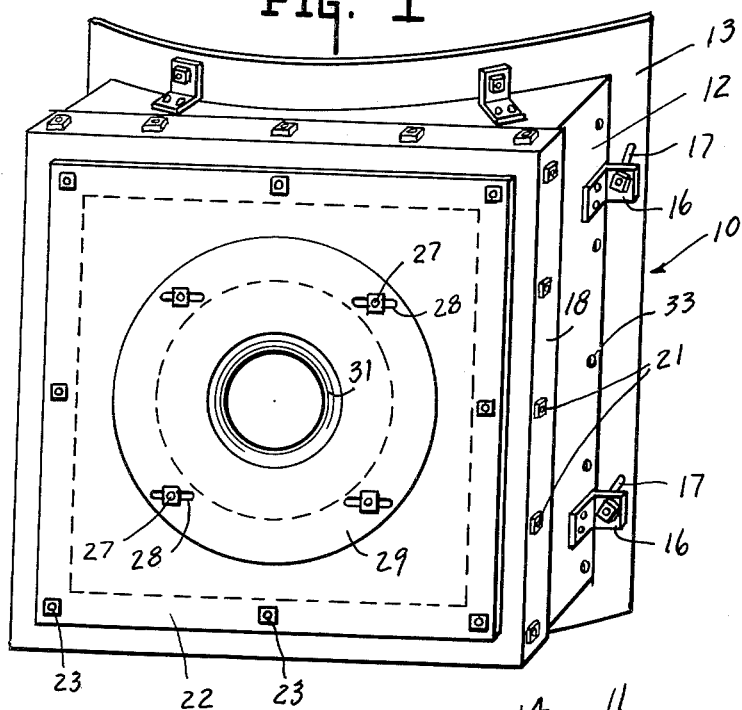
FIG. 1 is a perspective view of a structure embodying the present invention.
Figure 2:
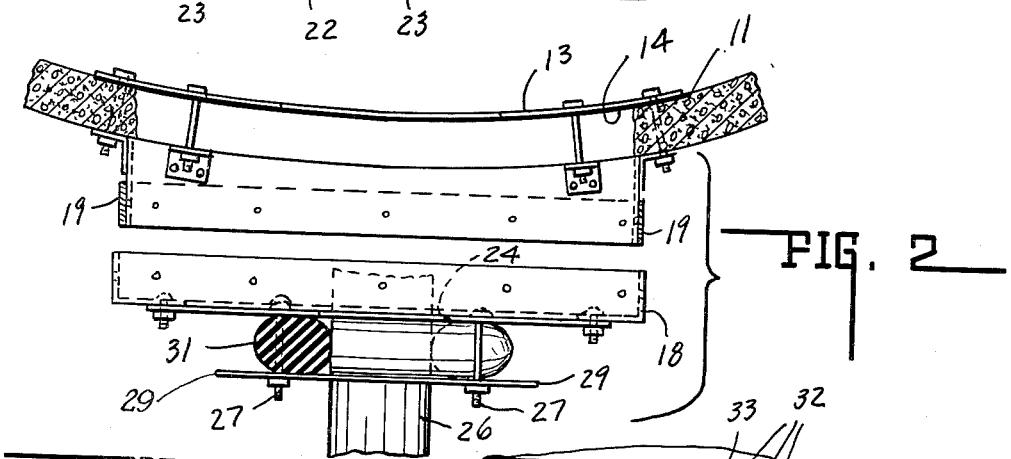
FIG. 2 is a top plan, exploded view of the apparatus shown in FIG. 1.
Figure 3:
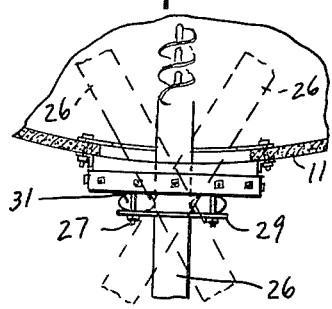
FIG. 3 is a top plan view showing the structure installed upon a silo with an auger tube in place thereon.
Figure 4:
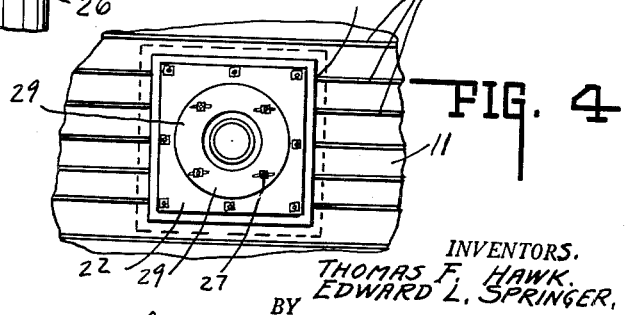
FIG. 4 is a front view of the structure installed upon a silo with the auger tube removed.

Referring initially to FIGS. 1 and 2, there is indicated generally at 10 an auger-entry type door structure adapted for mounting over an aperture in a silo wall indicated fragmentarily at 11. The door structure includes a frame assembly which is comprised of a generally rectangular, tubular section 12 which is rigidly secured and sealed to a generally rectangular frame 13. The frame provides an outwardly flanged margin for the tubular section and is adapted to be mounted against a silo wall and over an aperture cut in the silo wall. A gasket 14 or other sealing means is interposed between the frame 13 and the silo wall 11. The tubular portion carries brackets 16 which accommodate bolts 17 which, as may best be seen in FIG. 2, extend through the silo wall 11 and through the frame 13 accommodated against the inner face of the silo wall. Tightening of bolts or fasteners 17 serves to hold the frame assembly in place upon the silo and to tighten the inner frame 13 against the sealing gasket 14.

The tubular section is provided with a flanged door frame 18 which is sized so as to fit over the open end of the tubular section with a sealing gasket or similar sealing means 19 interposed therebetween. A series of bolts 21 (FIG. 1) serve to hold the frame 18 upon the tubular section. The frame 18 is closed by a closure plate 22 bolted thereto in sealed relation by means of a series of bolts 23. The closure plate is provided with a central circular aperture 24 which freely accommodates an auger tube indicated fragmentarily at 26. Extending outwardly from the front face of the closure plate are clamping bolts 27. The bolts extend through horizontal slots 28 in an annular pressure plate 29.

Interposed between the pressure plate and the closure plate is a sealing member which preferably takes the form of a rubber annulus 31. The sealing member is formed of rubber or similar material which is resilient and deformable under compression so as to alter the cross sectional configuration of the sealing member, thereby pressing the sides of the member 31 against the auger tube 26 in sealing relation.

Referring to FIGS. 1–4, the conventional side bands 32, customarily placed around a silo, extend through apertures 33 (FIG. 1), formed in the tubular section. The ends of the side bands may be threaded or otherwise modified to accommodate nuts or similar fasteners which bear against the inner surface of the tubular section and anchor the side bands. It may thus be seen that installation of the door structure upon a silo does not appreciably structurally weaken the silo since the reinforcing bands are anchored so as to retain their structural reinforcing function. If necessary, reinforcing angle irons may be disposed upon the inner surface of the tubular member to add to its rigidity.

In operation, an auger tube may be inserted into a silo through the door structure as indicated in FIG. 2. Tightening of the clamping bolts 27 serves to deform the sealing member 31 into sealing relation against the auger tube. The auger may then be operated to remove the contents of a silo to a point wherein a shift in the angle of entry of the auger is required in order to complete the removal of the silo contents.

When this occurs, the clamping bolts 27 are loosened and the pressure plate shifted transversely, the slots 28 therein permitting this sideward movement of the pressure plate. When so positioned, the auger tube 26 may be positioned to address the silo at various angles of entry as indicated by broken lines 26 in FIG. 3. Tightening of the clamping bolts 27 may then be accomplished and the consequent deformation of the sealing member 31 will seal the entry of the auger tube into the silo at its new angle of entry. Shifting of the angle of entry of the auger tube thus requires merely the loosening of the clamping bolts and shifting of the pressure plate and subsequent retightening of the bolts after the auger tube has been set at the desired angle.

From the foregoing it will be evident that the structure of the present invention provides a means whereby existing silos may be converted to sealed, auger-feed operation with a minimum of modification of the silo. It will be understood that the structure whereby the angle of entry of an auger tube may be varied might also be used on prefabricated silos which are specifically designed to accommodate the structure of the present invention. Where the structure is applied to existing silos, only the frame 13 need be custom made, this being required so that it may be accommodated upon the differing radius of curvature of various silo types.

It will be understood that the present invention is developed particularly for use in connection with silos or other storage compartments filled with high moisture content grain. This grain must be stored in the silo in the absence of air to prevent oxidation and spoilage. The "green" corn, for example, is loaded into the silo with the auger tube removed and with the withdrawal opening sealed in an airtight manner. When it is desired to remove this stored material, it is important that such removal be carried out permitting a minimum amount of air to enter the silo. The sealing cover is removed and since the grain is packed in the silo under its own weight which is considerable, and since it does not flow easily because of its green condition, removal of the cover plate does not result in any appreciable loss of material through the opening, the mass inside remaining relatively solid. The auger tube is then inserted at the opening in the manner described and during such insertions the auger is in operation so that it bores its way into the column of grain. During this entry of the auger tube the plate 29 is relatively loose so that the annular member is not compressed to any great extent, permitting the tube 26 to slide through it. When inserted to a desired depth, the auger is maintained running and the grain is withdrawn as will be understood. Normally, a "bridge" will soon be formed around the open end of the auger tube and the grain removal will cease. During this normal operation, the plate 29 is tightened down against the annular member so that it distorts against the tube providing an effective seal against the entry of air into the silo. During the insertion or withdrawal of the tube when the plate 29 is loose enough to permit the tube to slide past the annular member 31, very little air will enter the silo. To overcome the bridging which eventually occurs, the operator may loosen the plate 29 slightly, permitting the vibration of the auger tube as it operates to shake down more grain or break the bridge. If this is not effective to break the bridge, the plate 29 may be loosened and the auger tube pulled almost all the way out of the silo and then reinserted. This reinsertion may be at a different angle or it may be at the same angle from which tube was initially removed since the bridge or "bubble" occurs only at the open end of the auger. When the silo is almost empty, the grain may be at a very low level at the center of the silo but will extend to considerable heights along the margins, in other words, there will be an inverted cone void at the center of the silo. To remove this last quantity of grain the auger can be inserted at various angles so as to eat into the accumulations around the side of the silo. Since the grain in the silo is semi-solid and under considerable pressure the auger must be operating when it is inserted so that it can eat into the grain to make room for the tube. It will also be apparent that this solid mass of grain will not permit the auger to shift its angular position no matter how tightly the plate 29 is tightened down against the annular member. The auger, therefore, remains at the angle at which it is inserted into the silo contents.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. An entry door structure for silos having an opening therein, said structure comprising a plate-like frame for attachment to the interior surface of the wall of said silo, said frame having an opening of a size corresponding to that of said silo opening, an outwardly directed tubular section surrounding the opening defining said frame opening and coextensive therewith and adapted for attachment to the exterior surface of the silo, fastening means interconnecting said plate-like frame and said tubular section, a closure plate attached to the outer end of said tubular section, said closure plate having a central opening therein smaller than said frame opening, a flat annular pressure plate disposed in substantially spaced parallel relationship with said closure plate, said pressure plate having laterally disposed spaced apart slots near its periphery in parallelism with one another, clamping members projecting from said closure plate through said slots whereby to permit shifting of said pressure plate transversely of said wall opening, and an annular compressible member interposed between said closure and pressure plates with its openings concentric with the openings in said plates and whose outer periphery is disposed inwardly of said clamping members, the opening in said compressible member adapted to receive a tube for an auger, whereupon insertion of said tube within said openings and compression of said compressible member by said clamping members said tube will be held and sealed in said openings by said compressible member.

2. An entry door structure for silos having an opening therein, said structure comprising a plate-like frame for attachment to the interior surface of the wall of said silo, said frame having an opening of a size corresponding to that of said silo opening, an outwardly directed tubular section surrounding the opening defining said frame opening and coextensive therewith and adapted for attachment to the exterior surface of the silo, fastening means interconnecting said plate-like frame and said tubular section, a closure plate secured to the outer edges of said tubular section and having a central opening therein of less diameter than said frame opening, a flat annular pressure plate disposed in spaced parallel relationship with said closure plate, said pressure plate having spaced apart slots near its periphery in parallelism with one another, clamping bolts projecting from said closure plate through said slots, and an annular compressible member to receive the tube of an auger interposed between its closure and pressure plates with said opening concentric with the openings in said plates and whose outer periphery is disposed inwardly of said clamping bolts, whereby upon insertion of said tube within said openings and compression of said compressible member by said clamping members said tube will be held and sealed in said openings by said compressible member.

3. An entry door structure for silos having an opening therein, said structure comprising a plate-like frame for attachment to the interior surface of the wall of said silo said frame having an opening of a size corresponding to that of the silo opening, an outwardly directed tubular section surrounding the opening defining said frame opening and coextensive therewith and adapted for attachment to the exterior surface of the silo, fastening means interconnecting said plate-like frame and said tubular section, a closure plate attached to and projecting inwardly from the outer edges of said tubular section and having a central opening therein smaller than said frame opening, a flat annular pressure plate disposed in substantially spaced parallel relationship with said closure plate, holding means for maintaining said pressure plate in position, said pressure plate being adjustable laterally with respect to said holding means, and an annular compressible member interposed between said closure and pressure plates with its opening concentric with the openings in said plates and whose outer periphery is disposed inwardly of said holding means, the opening in said compressible member adapted to receve a tube for an auger, whereby upon insertion of said tube within said openings and compression of said compressible member by said clamping members said tube will be held and sealed in said openings by said compressible member.

(References on following page)

References Cited in the file of this patent

UNITED STATES PATENTS

| | | | |
|---|---|---|---|
| 921,586 | Brumbaugh | May 11, | 1909 |
| 1,515,637 | Wolf | Nov. 18, | 1924 |
| 1,911,076 | Gandola | May 23, | 1933 |
| 2,025,220 | Stuyverson | Dec. 24, | 1935 |
| 2,601,049 | Neighbour | June 17, | 1952 |
| 2,799,407 | Vanier et al. | July 16, | 1957 |
| 2,906,380 | Sanders | Sept. 29, | 1959 |

FOREIGN PATENTS

| | | | |
|---|---|---|---|
| 573,194 | Great Britain | Nov. 9, | 1945 |